United States Patent
Perera et al.

(10) Patent No.: US 7,242,923 B2
(45) Date of Patent: Jul. 10, 2007

(54) SYSTEM AND METHOD FOR AUTHENTICATING WIRELESS DEVICE WITH FIXED STATION

(75) Inventors: Surendra J. Perera, Lake Worth, FL (US); Deepak P. Ahya, Plantation, FL (US); Yanchen Qi, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 115 days.

(21) Appl. No.: 10/807,549

(22) Filed: Mar. 23, 2004

(65) Prior Publication Data
US 2005/0215233 A1 Sep. 29, 2005

(51) Int. Cl.
*H04M 1/66* (2006.01)
(52) U.S. Cl. .................. 455/411; 455/410; 455/67.111
(58) Field of Classification Search ................ 455/410, 455/411; 701/201, 208
See application file for complete search history.

(56) References Cited

U.S. PATENT DOCUMENTS

| | | | |
|---|---|---|---|
| 5,488,649 A * | 1/1996 | Schellinger ................ 455/411 |
| 6,505,215 B1 * | 1/2003 | Kruglikov et al. .......... 707/201 |
| 2002/0077078 A1 * | 6/2002 | Antti ........................ 455/410 |
| 2004/0192211 A1 * | 9/2004 | Gallagher et al. ....... 455/67.11 |

OTHER PUBLICATIONS

RFID Journal, "Sony, Philips Creating RFID Link", Sep. 17, 2002, http://www.rfidjournal.com/article/view/70.

* cited by examiner

*Primary Examiner*—Temica Beamer
*Assistant Examiner*—Joy Contee (57) ABSTRACT

A method is provided for authenticating a wireless device with a fixed station. A first authentication request is received from the wireless device when the wireless device detects that the fixed station is in close proximity, and a second authentication request is received from the fixed station when the fixed station detects that the wireless device is in close proximity. The first authentication request includes a first unique identifier for identifying the wireless device and a second unique identifier for identifying the fixed station, and the second authentication request includes the second unique identifier. The wireless device is authenticated with the fixed station based on whether the second unique identifier received in the first authentication request matches the second unique identifier received in the second authentication request, and also based on whether the first unique identifier received in the first authentication request is associated in an authentication database with the second unique identifier received in the second authentication request. Also provided is an authentication server for authenticating a wireless device with a fixed station.

15 Claims, 4 Drawing Sheets

SYSTEM AND METHOD FOR AUTHENTICATING WIRELESS DEVICE WITH FIXED STATION

FIELD OF THE INVENTION

The present invention generally relates to the field of wireless devices, and more particularly relates to an authentication system and method for wireless devices.

BACKGROUND OF THE INVENTION

With the advent of pagers and mobile telephones, the wireless service industry has grown into a multi-billion dollar industry. The Cellular Telecommunications and Internet Association calculates that 120 million Americans own a mobile telephone—almost half of the U.S. population. As the development and availability of mobile telephones progresses, the benefits of mobile telephones are reaching more and more people. Standard desktop telephones, however, are still used in greater numbers. The combination of both a mobile telephone and a standard desktop telephone for the same user has its drawbacks.

When a user is located at a stationary location (office, home, etc.), a standard desktop telephone is always preferred to a mobile telephone for reasons such as superior audio quality, ease of use, reliability of a fixed connection and no Radio Frequency (RF) utilization. Unfortunately, to allow mobility and still provide these advantages at the stationary location requires two independent devices (a mobile telephone and a desktop telephone) with two distinct telephone numbers and profiles (phone book, recent calls list, appointments, calendar, etc.) for each user.

It would be ideal to require only one telephone number and one profile that can be shared between a user's mobile telephone and desktop telephone. To this end, Voice over Internet Protocol (VoIP) desktop telephones and Wireless Local Area Network (WLAN) mobile telephones have enjoyed increasing popularity. VoIP desktop telephones are typically wire-enabled telephones that provide IP telephony over a network, such as the Internet. WLAN mobile telephones are mobile telephones that utilize IP telephony through a WLAN. However, for a LAN desktop telephone and a WLAN mobile telephone to share one telephone number and profile, there must be an efficient method and system for accurately identifying which mobile telephone or telephones are authorized to transfer their identity to a given desktop telephone.

Therefore a need exists to overcome the problems with the prior art as discussed above.

SUMMARY OF THE INVENTION

Briefly, in accordance with the present invention, disclosed is a system, method and computer readable medium for authenticating a wireless device with a fixed station. One embodiment of the present invention provides a method for authenticating a wireless device with a fixed station. According to the method, a first authentication request is received from the wireless device when the wireless device detects that the fixed station is in close proximity, and a second authentication request is received from the fixed station when the fixed station detects that the wireless device is in close proximity. The first authentication request includes a first unique identifier for identifying the wireless device and a second unique identifier for identifying the fixed station, and the second authentication request includes the second unique identifier for identifying the fixed station. The wireless device is authenticated with the fixed station based on whether the second unique identifier received in the first authentication request matches the second unique identifier received in the second authentication request, and also based on whether the first unique identifier received in the first authentication request is associated in an authentication database with the second unique identifier received in the second authentication request.

Another embodiment of the present invention provides an authentication system that includes a wireless device and a fixed station. The wireless device includes a first sensing mechanism for detecting when the fixed station is in close proximity, and a first transmitter for transmitting a first authentication request when the first sensing mechanism detects that the fixed station is in close proximity. The fixed station includes a second sensing mechanism for detecting when the wireless device is in close proximity, and a second transmitter for transmitting a second authentication request when the second sensing mechanism detects that the wireless device is in close proximity. The first authentication request includes a first unique identifier for identifying the wireless device and a second unique identifier for identifying the fixed station, and the second authentication request includes the second unique identifier for identifying the fixed station. The system further comprises an authentication server for receiving the first and second authentication requests and authenticating the wireless device with the fixed station based on whether the second unique identifier received in the first authentication request matches the second unique identifier received in the second authentication request, and also based on whether the first unique identifier received in the first authentication request is associated in an authentication database with the second unique identifier received in the second authentication request.

Yet another embodiment of the present invention provides an authentication server for authenticating a wireless device with a fixed station. The authentication server includes a receiver, an authentication database, and a processor. The receiver receives a first authentication request from the wireless device, which is sent when the wireless device detects that the fixed station is in close proximity, and a second authentication request from the fixed station, which is sent when the fixed station detects that the wireless device is in close proximity. The first authentication request includes a first unique identifier for identifying the wireless device and a second unique identifier for identifying the fixed station, and the second authentication request includes the second unique identifier for identifying the fixed station. The processor determines whether to authenticate the wireless device with the fixed station based on whether the second unique identifier received in the first authentication request matches the second unique identifier received in the second authentication request, and also based on whether the first unique identifier received in the first authentication request is associated in an authentication database with the second unique identifier received in the second authentication request.

Embodiments of the present invention allow a user having a wireless device and a fixed station to automatically and securely route telephone calls to the fixed station when the wireless device is in close proximity to the fixed station. Thus, the identity and profile information can be transferred to the fixed station when the wireless device is in close proximity, so as to provide the user with the advantages of the fixed station when near the fixed station. Further, the authentication provides security.

DETAILED DESCRIPTION

The present invention, according to one embodiment, overcomes problems with the prior art by providing a system, method an computer readable medium for authenticating a wireless device with a fixed station when the wireless device is placed within a predefined or close proximity of the fixed station for allowing the fixed station to assimilate the identity and profile of the wireless device.

Introduction

According to one embodiment, based on a proximity technology such as Radio Frequency Identification (RFID), inductive current, or physical contacts, a wireless device (such as a mobile telephone) reads a fixed station's unique identification when in close proximity to a fixed station (such as a desktop telephone). The wireless device sends an authentication request message including the fixed station's identification, the wireless device's identification, and a time stamp (i.e., the time when the fixed station's identification was read by the wireless device) to a network server. The fixed station also sends an authentication request message that includes its identification and the time stamp to the network server when it detects a wireless device in close proximity. A proximity sensor in the fixed station triggers this message to the network server. This sensing can be based on the detection of a change in inductive charging current if the fixed station is charging the wireless device or an embedded magnet and a detector.

The network server maintains an authentication database (e.g., lookup table) with fixed station identifications and corresponding wireless device identifications that are authorized to transfer their identities and profiles to a given fixed station. In order to be fully authenticated, the wireless device identification that the wireless device transmitted must be associated with the fixed station identification in the authentication database, the fixed station identification transmitted by the wireless device must match the fixed station identification transmitted by the fixed station, and the time stamps in both messages (from the wireless device and the fixed station) must substantially match. If fully authenticated, then the wireless device is allowed to transfer its identity and profile to the fixed station and the fixed station assumes the identity of the wireless device.

In this embodiment, the profile transfer is performed over a network. When a wireless device is successfully authenticated with the fixed station for the first time, the entire profile is transferred to the fixed station. At each subsequent authentication, the profiles are synchronized. If the wireless device identification in the inquiry message of the wireless device does not match with the entry for the fixed station in the authentication database, but the fixed station identifications on both messages match and the time stamps substantially match, then guest access to the fixed station is granted. Guest access allows the wireless device to temporarily transfer its identity and profile (via a temporary profile) to the fixed station. Alternatively, "unauthorized" status can be returned to the wireless device.

Communication System

Figure 1:
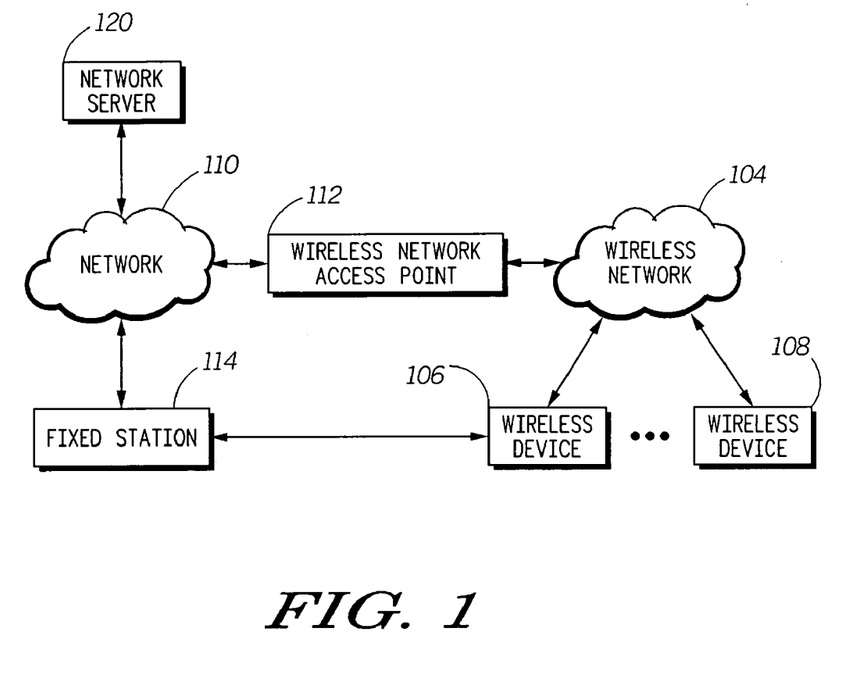
FIG. 1 is a block diagram illustrating a communication system according to one embodiment of the present invention.

FIG. 1 is a block diagram illustrating a communication system according to one embodiment of the present invention. The exemplary communication system of FIG. 1 includes a wireless network access point (WLAN AP) 112, a wireless network 104 and wireless devices 106 through 108, also known as subscriber units, which in this embodiment are mobile telephones, push-to-talk mobile radios, text messaging devices, handheld computers, pagers, beepers, or the like. The exemplary wireless network 104 is a wireless local area network (WLAN) for enabling mobile telephones, mobile text messaging devices, pagers, or the like, over a TCP/IP protocol, or the like. The wireless network 104 supports any number of wireless devices 106 through 108.

FIG. 1 further shows a network 110 connected to the wireless network 104 via the wireless network access point 112. In one embodiment of the present invention, the network 110 is a circuit switched network, such as the Public Service Telephone Network (PSTN). In another embodiment, the network is a packet switched network. The packet switched network is a wide area network (WAN), such as the global Internet, a private WAN, a local area network (LAN), a telecommunications network or any combination of the above-mentioned networks. The network 110 can be a wired network, a wireless network, a broadcast network or a point-to-point network.

FIG. 1 further shows a fixed station 114, which in this embodiment is a Voice over Internet Protocol (VoIP) enabled desktop telephone, that is connected to the network 110. Fixed station 114 is further selectively connected to the wireless device 106 via a detachable interface connection between the fixed station 114 and the wireless device 106, such as a serial connection, an infrared connection, a wireless Radio Frequency Identification (RFID) connection, and/or a wireless Bluetooth connection. A profile can be transferred between the wireless device 106 and the fixed station 114 via this detachable interface. An example of a profile is described in greater detail below.

(RFID) can be used to wirelessly transmit data between two devices. ISO 14443 is an international standard for radio frequency transmission and reception of identification information, as promulgated by the International Organization for Standardization of Geneva, Switzerland. Bluetooth is a protocol for enabling voice and data connections between a wide range of information processing devices through short-range digital two-way radio. The Bluetooth Specification, developed by an industry consortium, uses radio signaling in the 2.4 GHz range.

Fixed station 114 may further be connected to the wireless device 106 via a cradle or other type of charging station that allows a battery of the wireless device 106 to be charged. In various embodiments, different mechanisms are used to charge the wireless device 106 when in close proximity to the fixed station 114. In one embodiment, battery charging terminals are located on the outside of the wireless device 106 and are contacted by terminals on the charging station, and the battery of the wireless device 106 is charged via these terminals. In another embodiment, existing charging contacts in the CE bus of the wireless device 106 are used to charge the battery of the wireless device 106. In another embodiment of the present invention, an inductive charging mechanism is used to charge the battery of the wireless device 106 when in close proximity to the fixed station 114.

FIG. 1 further shows a network server 120 that is connected to the network 110. The network server 120 is an Authentication, Authorization, and Accounting ("AAA") server that performs functions including those related to the authentication process described below. In one embodiment of the present invention, the computer system of network server 120 is one or more Personal Computers (PCs) (e.g., IBM or compatible PC workstations running the Microsoft Windows operating system, Macintosh computers running the Mac OS operating system, or equivalent), or server system (e.g., SUN servers running the SunOS operating system or IBM RS/6000 servers running the AIX operating system).

Figure 2:
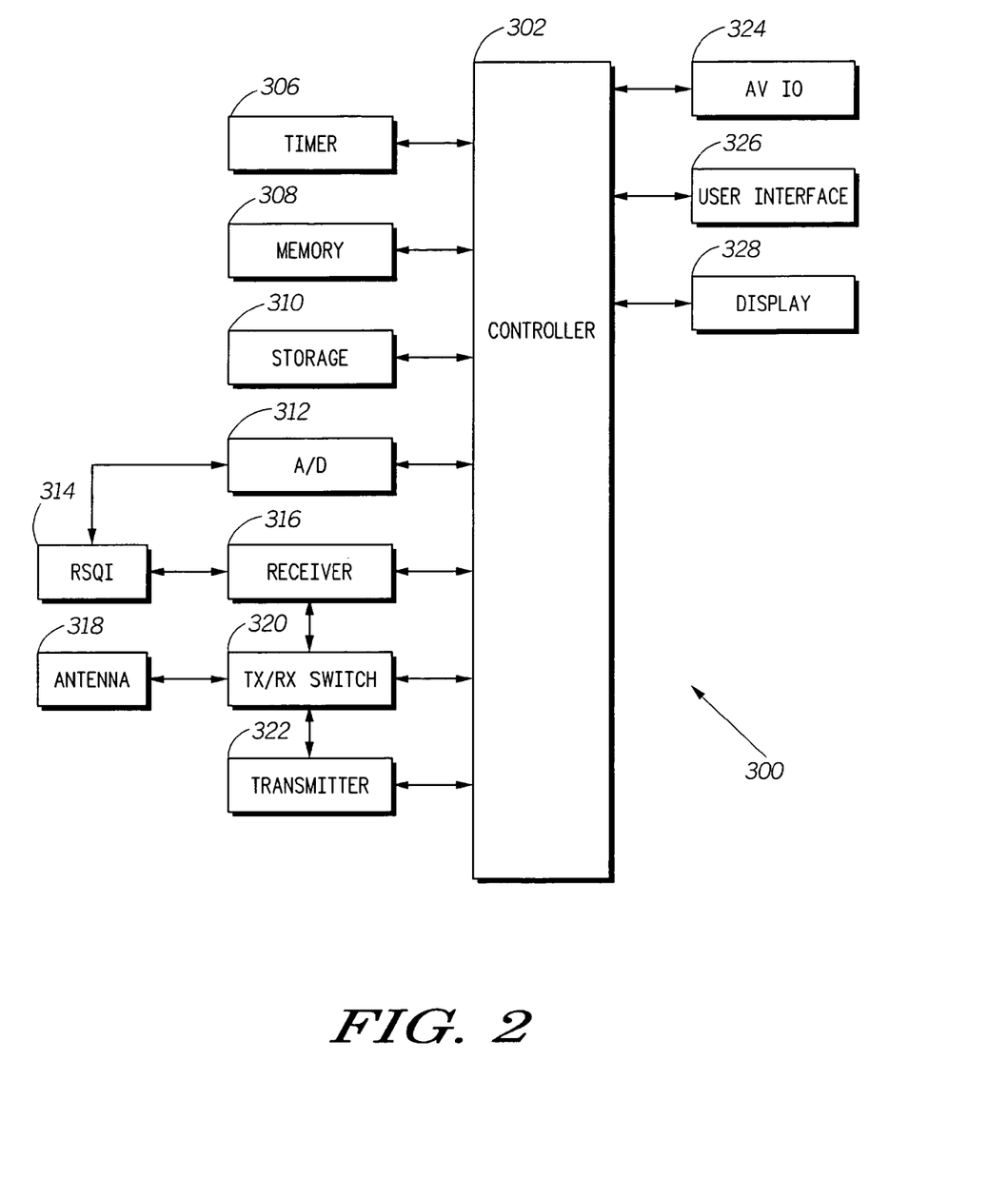
FIG. 2 is a block diagram illustrating a wireless device according to one embodiment of the present invention.

FIG. 2 is a block diagram illustrating a wireless device 300 according to one embodiment of the present invention. FIG. 2 shows a mobile telephone wireless device 300 (e.g., a mobile telephone). In this embodiment of the present invention, the wireless device 300 is a two-way radio capable of receiving and transmitting radio frequency signals over a communication channel under a communications protocol.

The wireless device 300 operates under the control of a controller 302, or processor, which performs various telephonic functions. In embodiments of the present invention, the processor 302 in FIG. 2 comprises a single processor or more than one processor for performing the tasks described below. FIG. 2 also includes a storage module 310 for storing information that may be used during the overall processes of the present invention. The controller 302 further switches the wireless device 300 between receive and transmit modes. In receive mode, the controller 302 couples an antenna 318 through a transmit/receive switch 320 to a receiver 316. The receiver 316 decodes the received signals and provides those decoded signals to the controller 302. In transmit mode, the controller 302 couples the antenna 318, through the switch 320, to a transmitter 322.

The controller 302 operates the transmitter 322 and receiver 316 according to instructions stored in memory 308. In embodiments of the present invention, memory 308 comprises any one or any combination of non-volatile memory, Flash memory or Random Access Memory. A timer module 306 provides timing information to the controller 302 to keep track of timed events.

In this embodiment, the wireless device 300 of FIG. 2 further includes an audio/video input/output module 324 for allowing the input and output of audio and/or video via the wireless device 300. This includes a microphone for input of audio and a camera for input of still images and/or video. This also includes a speaker for output of audio and a display for output of still images and video. Also included is a user interface 326 for allowing the user to interact with the wireless device 300, such as by modifying address book information, interacting with call data information, making/answering calls and interacting with a game. The interface 326 includes a keypad, a touch pad, a touch sensitive display or other means for input of information.

Authentication

The present invention provides a system and method for synchronizing the identity and stored contents of a wireless device 300, such as a profile of a mobile telephone, with a fixed station 114, such as a desktop telephone. Certain aspects of the synchronization process, such as data synchronization and the permanent storing of wireless device information in the fixed station 114, should only take place between an authorized wireless device/fixed station pair. Therefore, when a wireless device 300 is placed in the proximity of a fixed station 114, an authentication process is used to verify that the wireless device/fixed station pair is authorized for data synchronization and the permanent storing of wireless device information in the fixed station 114.

The pairing of a wireless device/fixed station pair can be categorized as either public or private. In a private pairing, the wireless device/fixed station pair is given full capability to perform all implemented functions. This can include the ability to transfer identity and data to and from the wireless device 300, to permanently store data in a secure private profile on the fixed station 114, to edit information presently stored on the fixed station 114, to initiate and receive an Interconnect Call/Dispatch Call/Group Call (IC/DC/GC) or data, and to charge the wireless device 300.

In a public pairing in this embodiment, "guest" access is provided by supporting all implemented functions except for the ability to permanently store data in a private profile on the fixed station 114. In this embodiment, a public profile is used in the fixed station 114 for a public pairing, and is then deleted when the wireless device 300 is removed from the proximity of the fixed station 114.

In order for the wireless device/fixed station pair to identify each other when in proximity, a proximity detection technology is used to transmit data, such as a unique identifier, a serial number or the like, between the pair of devices. In some embodiments of the present invention, RFID or Bluetooth is used to transmit data wirelessly between the pair of devices. In another embodiment of the present invention, the charging current or voltage of the cradle or charging station connected to the fixed station 114 is used to transmit data between the pair of devices. In an embodiment in which inductive charging is used to charge the wireless device 106, a message is modulated into the charging current or voltage of the charging station connected to the fixed station 114.

In yet another embodiment of the present invention, physical contacts in the cradle or charging station connected to the fixed station 114 are used to transmit data between the pair of devices.

Based on one of the above proximity technologies or some other proximity technology, the wireless device 300 reads the unique identification of the fixed station 114 ("FS-ID"). A network server 120 is used to authenticate the wireless device 300 before it is authorized to establish a public or private pairing with a given fixed station 114. Network server 120 maintains an authentication database (e.g., a lookup table, a relational database, or any other type of database) that contains a list of all FS-IDs and corresponding WD-IDs of wireless devices that are allowed to have a private pairing with each FS-ID.

The authentication process of this embodiment is based on two messages, one from the wireless device 300 and one from the fixed station 114. The wireless device 300 generates an inquiry message that includes: 1) an FS-ID read from the fixed station 114, 2) the wireless device's own unique WD-ID, and 3) a time stamp (e.g., the time when the FS-ID was read by the wireless device). The message is sent by the wireless device 300 to the network server 120 via the wireless network 104 and the network 110.

The fixed station also generates an inquiry message that includes: 1) the fixed station's FS-ID and 2) a time stamp (e.g., when the wireless device 300 was detected in close proximity). The message is sent to the network server 120 via the network 110. A sensor in the fixed station 114 detects when a wireless device is in close proximity and triggers the message. This sensing can be based on the detection of a change in charging load (of the charging station of the fixed station 114), the detection of a wireless device by a magnet and sensor, or any other proximity sensor.

Based on these two inquiry messages received from the wireless device 300 and the fixed station 114, the network server 120 determines whether the devices are authorized to establish a private or public pairing as follows. If the FS-ID in the wireless device inquiry message has an entry in the authentication database that includes the wireless device's WD-ID, the FS-ID in the fixed station inquiry message matches the FS-ID in the wireless device inquiry message, and the time stamps in both inquiry messages match closely (e.g., the difference is less than a threshold delay), then the wireless device is fully authenticated and the devices are authorized for private pairing.

If fully authenticated, the network server 120 fetches the Internet Protocol (IP) address of the fixed station 114 from a Domain Name Server (DNS), and sends the IP address of the fixed station 114 to the wireless device 300 together with a "private pairing" flag. The network server 120 also sends the "private pairing" flag to the fixed station 114. When the private pairing flag is received, the identity (e.g., telephone number) of the wireless device is transferred to the fixed station, and all stored profile information is securely synchronized between the two devices.

More specifically, in this embodiment call forwarding is used to allow the devices to share the same telephone number by effectively transferring this number as appropriate. This call forwarding is handled by Session Initiation Protocol. When the private pairing flag is received, the wireless device 300 sends a call forward request message through SIP protocol so that all future calls (interconnect, private, group, data, etc.) are forwarded to the fixed station 114. The call forward request message contains the IP address of the fixed station 114 that was received from the network server. Thus, authentication is used as the enabler that allows the fixed station to share one number with the wireless device and take over call capabilities when the wireless device is in close proximity.

Further, the stored profile information includes phone book information, appointments, calendar information, reminders, recent call history information and any other personal information stored on the wireless device. The synchronization process involves transferring some or all of this information between the devices so that both devices have the current profile information. Such synchronization can be performed using one or more commercially available mechanisms, such as Microsoft ActiveSync, AirSync, or the like. Further, such synchronization can take place over one or both of the WLAN and LAN networks. The type of synchronization that takes place between the devices depends on the type of pairing flag (private/public) received from the network server.

When the private pairing flag is received in this embodiment, upon the first pairing the identity (e.g., telephone number) and all of the profile information are transferred from the wireless device to a permanent private profile on the fixed station. When the wireless device is removed from being in close proximity to the fixed station, in this embodiment the fixed station sends a wireless device disconnected message to the wireless device, and the wireless device sends a call forward cancel message through SIP protocol to end call forwarding to the fixed station. For example, load change detection circuitry or a magnetic contact and sensor can be used to detect the removal of the wireless device from being in close proximity to the fixed station. In one embodiment, if the profile information is altered on the fixed station, the wireless device is synchronized so as to receive the updated data when removal is detected.

At each subsequent private pairing of these two devices, a call forward request message is again sent to transfer the telephone number and an incremental update of all of the profile information is performed between the devices in both directions to make both stored profiles current.

On the other hand, if the lookup operation shows that the FS-ID entry does not include the WD-ID in the wireless device inquiry message, but the FS-ID in the fixed station inquiry message matches the FS-ID in the wireless device inquiry message and the time stamps in both inquiry messages match closely, then the wireless device is partially authenticated and the devices are authorized for public pairing.

If partially authenticated, in this embodiment the network server 120 fetches the IP address of the fixed station 114 from a DNS, and sends the IP address of the fixed station 114 to the wireless device 300 together with a "public pairing" flag. The network server 120 also sends the "public pairing" flag to the fixed station 114.

When the public pairing flag is received in this embodiment, the identity (e.g., telephone number) is transferred to the fixed station by sending a call forward request message, and all pertinent profile information is transferred from the wireless device to a temporary public profile on the fixed station. When the wireless device is later removed from being in close proximity to the fixed station, the wireless device is synchronized so as to receive any updated profile information, the wireless device sends a call forward cancel message to end call forwarding to the fixed station, and the public profile stored on the fixed station is deleted. (In another embodiment, the devices are not unauthorized for any pairing if the wireless device is not fully authenticated.)

If neither of the above two authentication scenarios (full or partial) are fulfilled in the lookup operation, then the wireless device is not authenticated and the devices are not unauthorized for pairing. Thus, the wireless device's identity and profile are not transferred to the fixed station 114.

Control Flows

Figure 3:
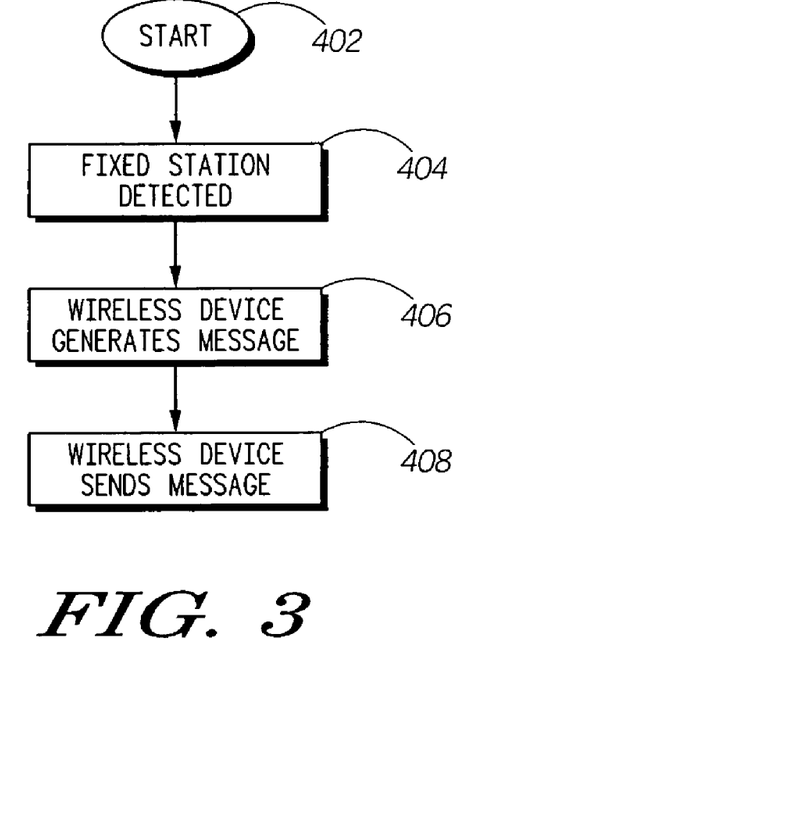
FIGS. 3 and 4 are operational flow diagrams depicting the inquiry message process according to one embodiment of the present invention.
Figure 4:
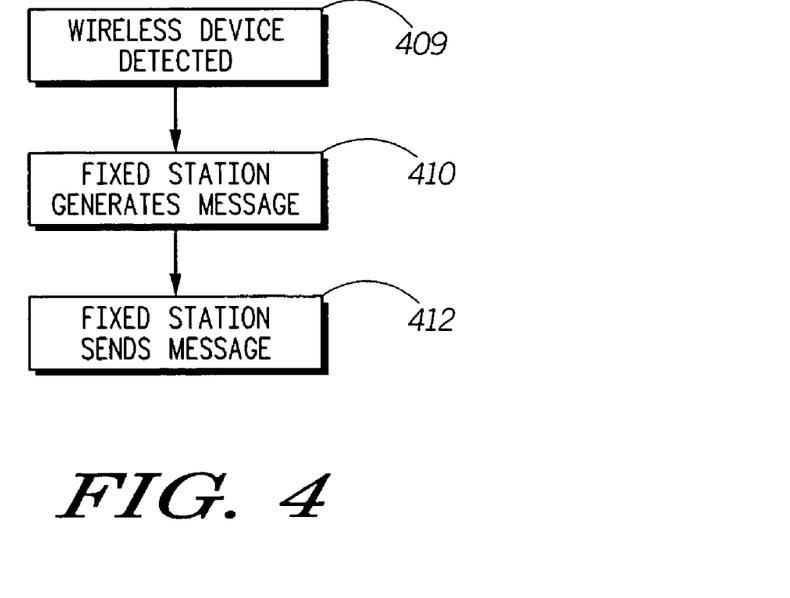

FIGS. 3 and 4 are operational flow diagrams depicting the inquiry message process according to one embodiment of the present invention. The operational flow diagrams of FIGS. 3 and 4 depict the process of generating and sending inquiry messages to the network server 120. The operational flow diagram of FIG. 3 begins with step 402 and flows directly to step 404.

In step 404, the wireless device 300 (e.g., mobile telephone) detects that it is in close proximity to the fixed station 114 (e.g., desktop telephone). In step 406, the wireless device 300 reads (or receives) the FS-ID from the fixed station 114 and then generates an inquiry message that includes: 1) the FS-ID read from the fixed station 114, 2) the wireless device's own unique WD-ID, and 3) a time stamp (e.g., the time when the FS-ID was read by the wireless device). In step 408, the message is sent by the wireless device 300 to the network server 120 via the wireless network 104 and the network 110.

As shown in FIG. 4, in step 409, the fixed station 114 detects that the wireless device 300 is in close proximity. In step 410, the fixed station generates an inquiry message that includes: 1) the fixed station's FS-ID and 2) a time stamp (e.g., the time when the wireless device 300 was detected in close proximity). In step 412, the message is sent by the fixed station 114 to the network server 120 via the network 110.

Figure 5:
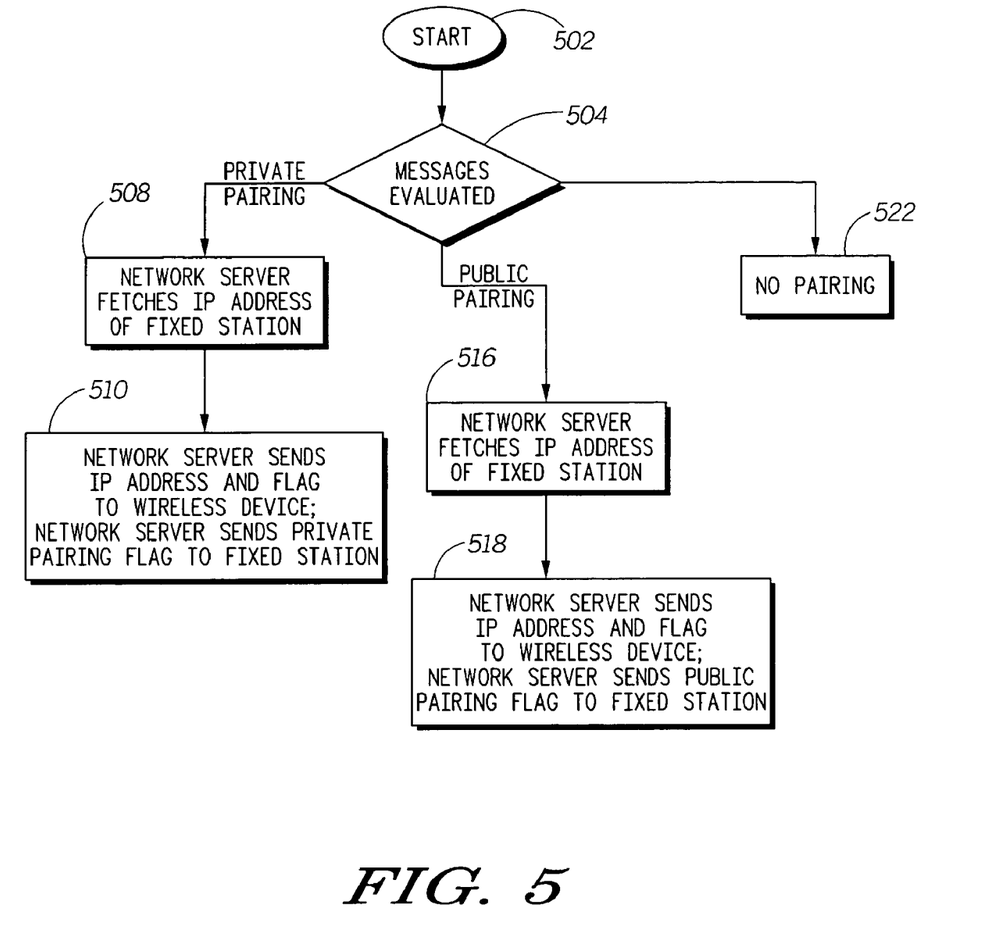
FIG. 5 is an operational flow diagram depicting the authentication process according to one embodiment of the present invention.

FIG. 5 is an operational flow diagram depicting the authentication process according to one embodiment of the present invention. The operational flow diagram of FIG. 5 depicts the process of determining whether a wireless device 300 is authorized to utilize some or all of the features of a fixed station 114. The operational flow diagram of FIG. 5 begins with step 502 and flows directly to step 504.

In step 504, the inquiry messages received from the wireless device 300 and the fixed station 114 are evaluated by the network server 120. More specifically, the network server 120 determines whether: 1) the FS-ID in the wireless device inquiry message has an entry in the authentication database that includes the received WD-ID, 2) the FS-ID in the fixed station inquiry message matches the FS-ID in the wireless device inquiry message, and 3) the time stamps in both inquiry messages match closely (e.g., the difference is less than a threshold delay, such as one second). If the results of all three determinations of step 504 are affirmative, then the wireless device is fully authenticated and the devices are authorized for private pairing.

For the private pairing, in step 508, the network server 120 fetches the Internet Protocol (IP) address of the fixed station 114 from a Domain Name Server (DNS). In step 510, the network server 120 sends the IP address of the fixed station 114 to the wireless device 300 together with a "private pairing" flag. Additionally, the network server 120 sends the "private pairing" flag to the fixed station 114.

If, the results of the determinations of step 504 are that the FS-ID entry does not include the WD-ID received in the wireless device inquiry message, but that: 1) the FS-ID in the fixed station inquiry message matches the FS-ID in the wireless device inquiry message and 2) the time stamps in both inquiry messages match closely, then the wireless device is partially authenticated and the devices are authorized for public pairing.

For the public pairing, in step 516, the network server 120 fetches the IP address of the fixed station 114 from a DNS. In step 518, the network server 120 sends the IP address of the fixed station 114 to the wireless device 300 together with a "public pairing" flag. Additionally, the network server 120 sends the "public pairing" flag to the fixed station 114.

If the results of the determinations of step 504 do not fulfill either of the above two scenarios, then in step 522 the devices are not unauthorized for any pairing. Thus, the wireless device's identity and profile are not transferred to the fixed station 114.

Exemplary Implementations

The present invention can be realized in hardware, software, or a combination of hardware and software. A system according to an embodiment of the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose processor with a computer program that, when being loaded and executed, controls the processor such that it carries out the methods described herein.

The present invention can also be embedded in a computer program product, which comprises all the features enabling the implementation of the methods described herein, and which—when loaded in a system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer program product on a computer readable medium, allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for authenticating a wireless device with a fixed station, the method comprising the steps of:

receiving a first authentication request from the wireless device at the fixed station when the wireless device detects that the fixed station is in close proximity, the first authentication request including a first unique identifier for identifying the wireless device and a second unique identifier for identifying the fixed station;

receiving a second authentication request from the fixed station at the wireless device when the fixed station detects that the wireless device is in close proximity, the second authentication request including the second unique identifier for identifying the fixed station;

authenticating the wireless device with the fixed station based on whether the second unique identifier received in the first authentication request matches the second unique identifier received in the second authentication request, and also based on whether the first unique identifier received in the first authentication request is associated in an authentication database with the second unique identifier received in the second authentication request; and assuming the identity of the wireless device at the fixed station after authenticating the wireless device with the fixed station;

wherein the first authentication request further includes a first time stamp based on when the wireless device detected that the fixed station was in close proximity, the second authentication request further includes a second time stamp based on when the fixed station detected that the wireless device was in close proximity, and in the authenticating step, the wireless device is authenticated with the fixed station only if the first time stamp received in the first authentication request substantially matches the second time stamp received in the second authentication request.

2. The method of claim 1, further comprising the step of reading the second unique identifier from the fixed station when the wireless device detects that the fixed station is in close proximity.

3. The method of claim 1, wherein the authenticating step includes the sub-step of transmitting a first pairing flag to both the wireless device and the fixed station if:
the first unique identifier received in the first authentication request is associated in the authentication database with the second unique identifier received in the second authentication request,
the second unique identifier received in the first authentication request matches the second unique identifier received in the second authentication request, and
the first time stamp received in the first authentication request substantially matches the second time stamp received in the second authentication request.

4. The method of claim 3, wherein the authenticating step includes the sub-step of transmitting a second pairing flag to both the wireless device and the fixed station if:
the first unique identifier received in the first authentication request is not associated in the authentication database with the second unique identifier received in the second authentication request,
the second unique identifier received in the first authentication request matches the second unique identifier received in the second authentication request, and
the first time stamp received in the first authentication request substantially matches the second time stamp received in the second authentication request.

5. The method of claim 4, further comprising the step of transferring a telephone number from the wireless device to the fixed station and temporarily transferring stored profile information from the wireless device to the fixed station, if the second pairing flag is received.

6. The method of claim 3, further comprising the step of transferring a telephone number from the wireless device to the fixed station and synchronizing stored profile information between the wireless device and the fixed station, if the first pairing flag is received.

7. The method of claim 1, wherein the fixed station is a LAN desktop telephone and the wireless device is a WLAN mobile telephone.

8. An authentication system comprising:
a wireless device that includes a first sensing mechanism and a first transmitter; and
a fixed station that includes a second sensing mechanism for detecting when the wireless device is in close proximity, and a second transmitter for transmitting a second authentication request when the second sensing mechanism detects that the wireless device is in close proximity, the second authentication request including a second unique identifier for identifying the fixed station,
wherein the first sensing mechanism detects when the fixed station is in close proximity, and the first transmitter transmits a first authentication request when the first sensing mechanism detects that the fixed station is in close proximity, the first authentication request including a first unique identifier for identifying the wireless device and the second unique identifier for identifying the fixed station; and the system further comprises an authentication server for receiving the first and second authentication requests and authenticating the wireless device with the fixed station based on whether the second unique identifier received in the first authentication request matches the second unique identifier received in the second authentication request, and also based on whether the first unique identifier received in the first authentication request is associated in an authentication database with the second unique identifier received in the second authentication request;
wherein the first authentication request further includes a first time stamp based on when the first sensing mechanism detected that the fixed station was in close proximity,
the second authentication request further includes a second time stamp based on when the second sensing mechanism detected that the wireless device was in close proximity, and
the authentication server authenticates the wireless device with the fixed station only if the first time stamp in the first authentication request substantially matches the second time stamp in the second authentication request.

9. The system of claim 8, wherein the wireless device reads the second unique identifier from the fixed station when the first sensing mechanism of the wireless device detects that the fixed station is in close proximity.

10. The system of claim 8, wherein the authentication server transmits a pairing flag to both the wireless device and the fixed station if;
the first unique identifier in the first authentication request is associated in the authentication database with the second unique identifier in the second authentication request,
the second unique identifier in the first authentication request matches the second unique identifier in the second authentication request, and
the first time stamp in the first authentication request substantially matches the second time stamp in the second authentication request.

11. The system of claim 10, wherein the wireless device sends a message to transfer a telephone number from the wireless device to the fixed station, if the pairing flag is received.

12. The system of claim 8, wherein the fixed station is a LAN desktop telephone and the wireless device is a WLAN mobile telephone.

13. An authentication server for authenticating a wireless device with a fixed station, the authentication server comprising:
a receiver for receiving a first authentication request from the wireless device when the wireless device detects that the fixed station is in close proximity, and a second authentication request from the fixed station when the fixed station detects that the wireless device is in close proximity, the first authentication request including a first unique identifier for identifying the wireless device and a second unique identifier for identifying the fixed station, and the second authentication request including the second unique identifier for identifying the fixed station;
an authentication database; and
a processor for determining whether to authenticate the wireless device with the fixed station based on whether the second unique identifier received in the first authentication request matches the second unique identifier received in the second authentication request, and also based on whether the first unique identifier received in the first authentication request is associated in an authentication database with the second unique identifier received in the second authentication request;

wherein the first authentication request further includes a first time stamp based on when the wireless device detected that the fixed station was in close proximity, the second authentication request further includes a second time stamp based on when the fixed station detected that the wireless device was in close proximity, and the processor authenticates the wireless device with the fixed station only if the first time stamp received in the first authentication request substantially matches the second time stamp received in the second authentication request.

14. The authentication server of claim 13, wherein the processor further includes a transmitter for transmitting a first pairing flag to both the wireless device and the fixed station if:

the first unique identifier received in the first authentication request is associated in the authentication database with the second unique identifier received in the second authentication request, the second unique identifier received in the first authentication request matches the second unique identifier received in the second authentication request, and the first time stamp received in the first authentication request substantially matches the second time stamp received in the second authentication request.

15. The authentication server of claim 14, wherein the transmitter transmits a second pairing flag to both the wireless device and the fixed station if:

the first unique identifier received in the first authentication request is not associated in the authentication database with the second unique identifier received in the second authentication request, the second unique identifier received in the first authentication request matches the second unique identifier received in the second authentication request, and the first time stamp received in the first authentication request substantially matches the second time stamp received in the second authentication request.

* * * * *